United States Patent [19]

Aubry et al.

[11] Patent Number: 4,621,834
[45] Date of Patent: Nov. 11, 1986

[54] SUSPENSION SYSTEM FOR A SET OF VEHICLE WHEELS WITH RIGID AXLE

[75] Inventors: Jacques Aubry, Cabries; Michel Bonfils, St. Cannat; Jean-Paul Merlet, Mimet, all of France

[73] Assignee: Societe Nationale Industrielle Aerospatiale, Paris, France

[21] Appl. No.: 717,038

[22] Filed: Mar. 28, 1985

[30] Foreign Application Priority Data

Apr. 3, 1984 [FR] France ................. 84 05246

[51] Int. Cl.⁴ ............... B60G 9/04; B60G 11/44; B62D 53/06
[52] U.S. Cl. .................... 280/715; 267/57; 280/718; 280/723
[58] Field of Search ............. 280/718, 715, 710, 721, 280/723; 267/57

[56] References Cited

U.S. PATENT DOCUMENTS 4,225,152  9/1980  Eaton ........................... 280/718

FOREIGN PATENT DOCUMENTS 1061634  7/1959  Fed. Rep. of Germany ...... 280/715

Primary Examiner—John J. Love
Assistant Examiner—Kenneth R. Rice
Attorney, Agent, or Firm—Fisher, Christen & Sabol

[57] ABSTRACT

The invention relates to a suspension system for a set of vehicle wheels with rigid axle, wherein it comprises, on the one hand, a horizontal and transverse torsion bar articulated so as to be able to rotate about its longitudinal axis and, on the other hand, two longitudinal elastic blades which are disposed laterally each on one side of said chassis and of which each is rigidly connected at one of its ends to said torsion bar, is fixed in its intermediate part to said rigid axle and is in abutment at its other end against said chassis. The invention is more particularly applicable to a suspension system for road tractor.

15 Claims, 8 Drawing Figures

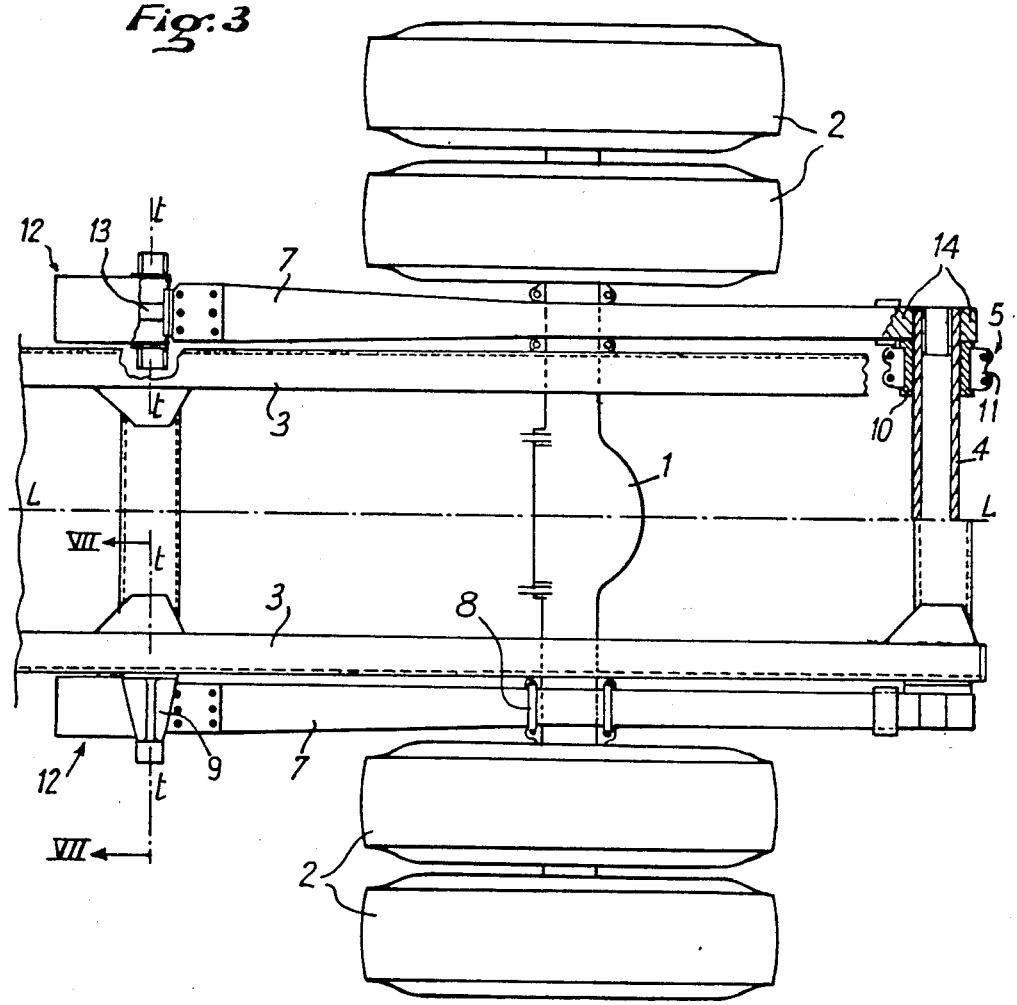
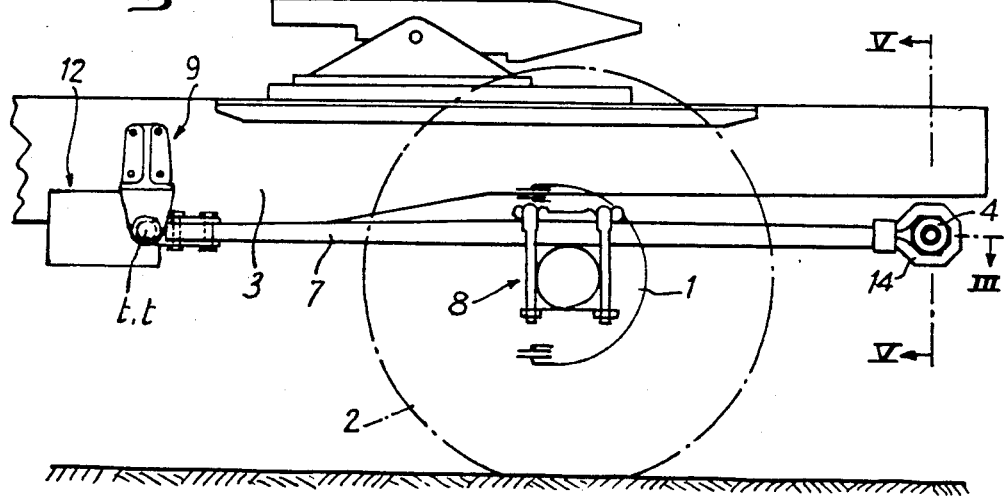

SUSPENSION SYSTEM FOR A SET OF VEHICLE WHEELS WITH RIGID AXLE

The present invention relates to a suspension system for a set of vehicle wheels with rigid axle. It is particularly, although not exclusively, suitable for producing the rear suspension of a road tractor of the type used in semitrailer trucks.

To this end, according to the invention, the suspension system for a set of vehicle wheels with rigid axle, is noteworthy in that it comprises, on the one hand, a horizontal and transverse torsion bar articulated on the chassis of the vehicle so as to be able to rotate about its longitudinal axis and, on the other hand, two longitudinal elastic blades which are disposed laterally each on one side of said chassis and of which each is rigidly connected at one of its ends to said torsion bar, is fixed in its intermediate part to said rigid axle and is in abutment at its other end against said chassis.

Said torsion bar associated with the blades thus performs the function of anti-roll and the longitudinal efforts (traction and braking) are transmitted from the wheels to the chassis by the blades and said torsion bar.

Furthermore, the two elastic blades ensure the vertical suspension and lateral guiding of the wheels of said set of wheels.

Said torsion bar is advantageously offset longitudinally with respect to said rigid axle. In this way, a large space is freed around this axle. Such an advantage is particularly important when said rigid axle constitutes the rear axle of the vehicle. Said torsion bar is in that case preferably to the rear with respect to said rear axle.

Said lateral elastic blades are advantageously identical and disposed symmetrically with respect to the longitudinal axis of said vehicle.

It will be noted that, in the suspension system according to the invention, when the lateral blades are deformed, said bearing on the chassis moves longitudinally. According to an interesting feature of the present invention, the bearing of each lateral elastic blade on the chassis thus comprises a shock absorber which is articulated about a transverse axis of the chassis and of which the line of action is aligned with said elastic blade.

It will also be noted that, since the efforts ot traction pass through the blades, between the rear axle and the chassis, the fact of the vehicle starting up tends to straighten the blades and therefore to decrease the angle of winding of said rear axle. Furthermore, the latter may be set so as to obtain an optimum angle of winding for moderate stresses.

The articulation of the torsion bar with respect to the chassis of the vehicle may be obtained by means of at least one elastomeric bearing. Moreover, to avoid to a maximum the excess stresses between the blades and said torsion bar, the connecting means between the torsion bar and the lateral elastic blades are chosen so that they ensure a considerable, but not absolute, rigidity.

Said torsion bar and said elastic blades are preferably made of high-resistance fibers coated with synthetic resin. The fact of making said bars and blades in composite fiber/synthetic resin material makes it possible to obtain for these elements mechanical characteristics corresponding to the functions that they perform and which it would be impossible to obtain with steel elements, with comparable dimensions and weight. Thanks to the present invention, a suspension may therefore be made which, whilst being simple, is light, with the result that it enables a saving in the overall weight of the vehicle, and therefore a saving in fuel consumption, to be obtained. For example, the torsion bar is made in the form of a tube of polygonal outer section in order to facilitate by mechanical fit its connection with the blades at each of its ends.

It will be noted that the positioning of the suspension system according to the invention on a vehicle is particularly simple, so that not only such a system may be mounted on vehicles especially provided to that end, but also existing vehicles may be easily modified to assemble the system according to the invention thereon.

The invention will be more readily understood on reading the following description with reference to the accompanying drawings, in which:

FIG. 3 illustrates a practical embodiment of the suspension system according to the invention mounted on a road tractor, in plan view with parts torn away.

FIG. 4 is a side view corresponding to FIG. 3.

Figure 1:
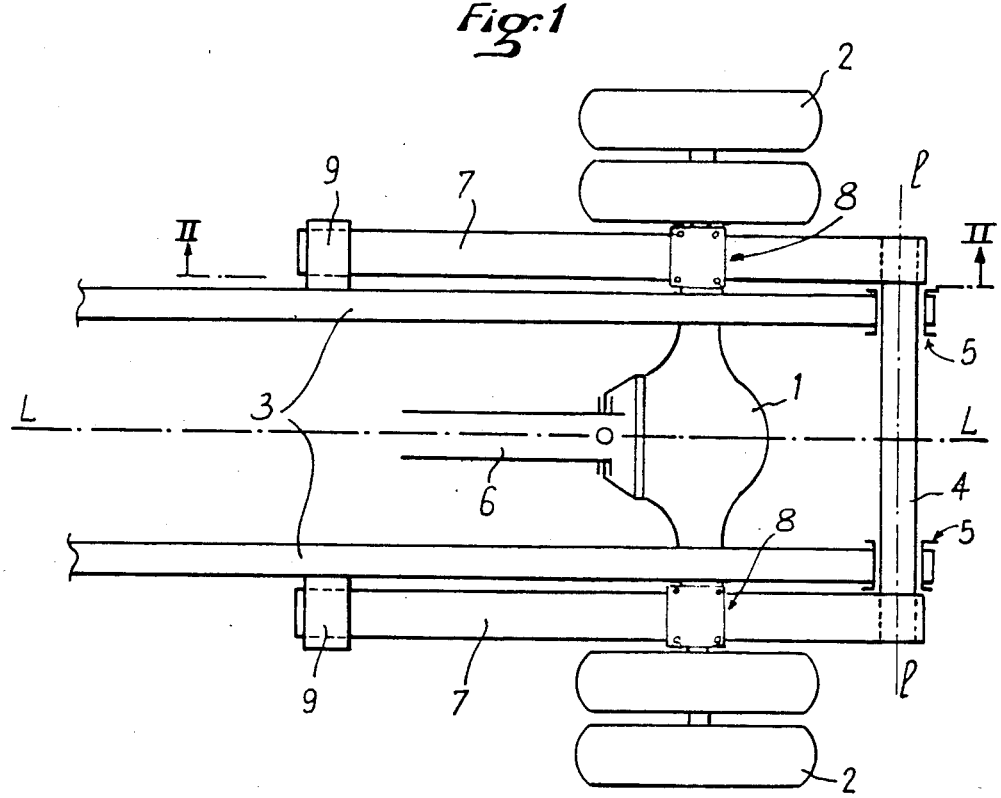
FIG. 1 is a schematic plan view of the suspension system according to the invention.
Figure 2:
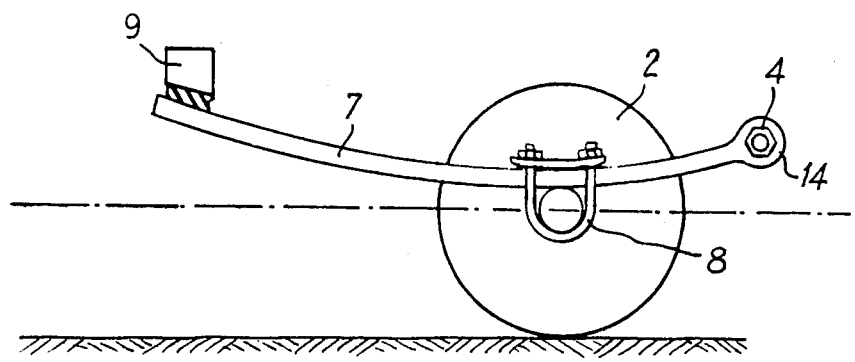
FIG. 2 is a section along line II—II of FIG. 1.

Referring now to the drawings, the suspension system according to the invention is applied to the rear set of wheels of a road tractor, constituted by a rear axle 1 bearing wheels 2 at its ends. In these Figures, the vehicle is shown only by its longitudinal axis L—L and a portion of its chassis 3.

This suspension system comprises a transverse torsion bar 4, whose axis 1—1 is transverse to the median longitudinal plane of the vehicle. Thanks to bearings 5, the bar 4 is articulated on the chassis 3 to enable it to rotate about its longitudinal axis 1—1 which is horizontal. This torsion bar 4 is disposed to the rear of the rear axle 1, i.e. on the side of the latter opposite the power transmission shaft 6 which extends longitudinally with respect to the vehicle.

The suspension system according to the invention further comprises two longitudinal elastic blades 7, disposed laterally, on either side of the chassis 3.

These blades 7 are identical and disposed symmetrically with respect to said median longitudinal plane L—L.

Each elastic blade 7:
- is rigidly connected at its rear end to a lateral end of the torsion bar 4;
- is fixed by its intermediate part to said rear axle 1, via a fixing device 8;
- and is in abutment by its front end against the chassis 3, via bearing devices 9.

In the suspension system which has just been described:

the functions of vertical suspension and of lateral guiding are ensured by the elastic blades 7, in association with the rear axle 1;

the function of anti-camber (or anti-roll) is ensured by the torsion of bar 4, by the differential bending of the blades 7 and possibly by the torsion of said blades;

the function of transmission of the longitudinal efforts is ensured by bar 4 and those parts of the blades 7 included between the bar and the rear axle 1.

Figure 5:
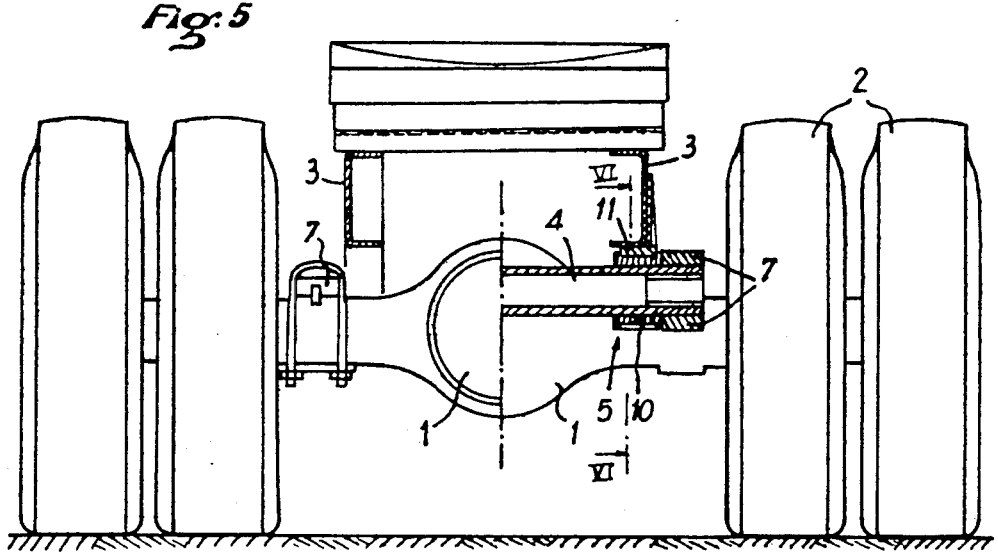
FIG. 5 is, in its left-hand part, a partial half-view from the rear of the road tractor of FIGS. 3 and 4 and, in its right-hand part, a half-section along line V—V of FIG. 4.
Figure 6:
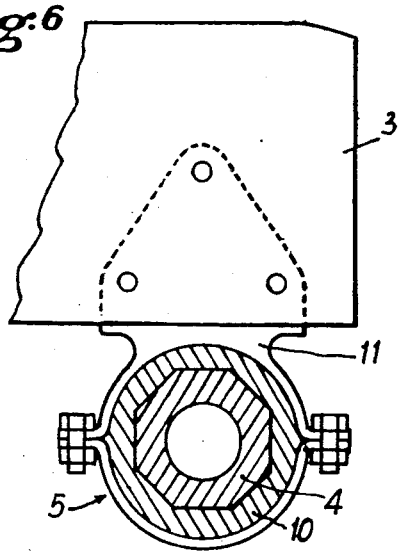
FIG. 6 is a view in section along line VI—VI of FIG. 5, illustrating the articulation of the torsion bar on the chassis.
Figure 7:
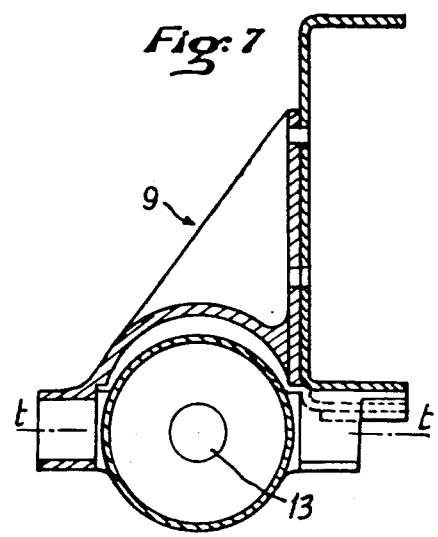
FIG. 7 is a view in section along line VII—VII of FIG. 3, illustrating the bearing of the elastic blades on the chassis.

In the embodiment of FIGS. 3 to 8, the bearings 5 are in the form of elastomeric bearings comprising a ring 10 of elastomer material blocked between the torsion bar 4 and a mount 11 fast with the chassis 3 (cf. FIGS. 3, 5 and 6).

Consequently, these elastomeric bearings 5 ensure filtering of the longitudinal efforts.

Furthermore, in the embodiment of FIGS. 3 to 8, shock absorbers 12 have been provided, which may be of any type but which are shown here in the form of axially displaced hydraulic dampers, and which are provided to serve as bearing 9 at the front ends of the blades 7.

Shock absorbers 12 are articulated on the chassis 3 about axes t—t transverse to said blades and their mobile element 13 is rendered fast therewith. In this way, these shock absorbers 12 are actuated by the longitudinal displacement of the front ends of the blades 7, when the latter perform their movement of bending (cf. FIGS. 3, 4 and 7).

The torsion bar 4 and the blades 7 are preferably constituted by elements made of a composite material constituted by fibers (glass, carbon, boron, etc... or a mixture of these matters) coated with a synthetic resin by any known process (filamentary winding, superposition of braiding, weaving, etc...) making it possible to obtain for said bars high values of the ratio E/R, in which R is the breaking stress and E the modulus of elasticity.

As shown in FIGS. 3, 4 and 5, at its rear end, each blade 7 forms a loop 14 in which is fitted the corresponding end of the torsion bar 4. The latter may present an outer contour of polygonal shape.

In the embodiment described, the blades are advantageously made of rovings of glass fibers impregnated with epoxy resin, oriented longitudinally in the axis of the blade, the whole being polymerized hot and under pressure in a mould. To facilitate manufacture and conserve continuity of the rovings, the blades are of constant section.

Figure 8:
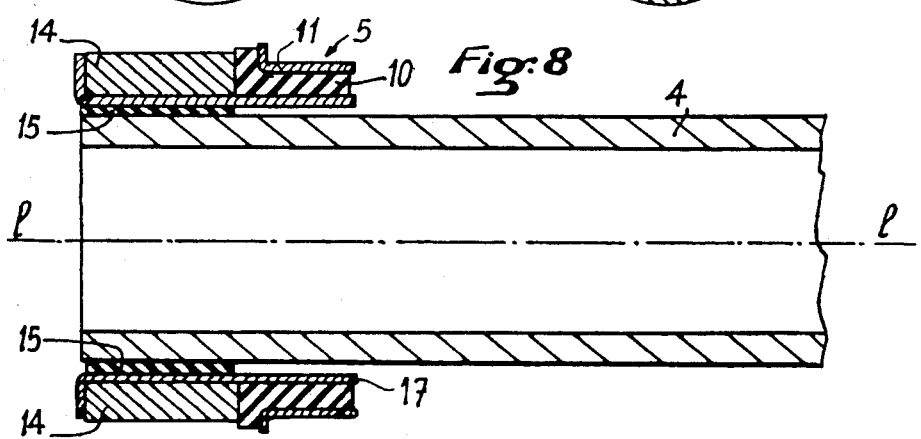
FIG. 8 illustrates, in section, a preferred mode of connection between the torsion bar and the elastic blades.

The variant embodiment shown in FIG. 8 includes the elastomeric bearings 5 with their elastomer ring 10, intended to articulate the torsion bar 4/elastic blades 7 assembly with respect to chassis 3. However, instead of fitting the ends of the bar 4 directly in the loops 14 of the blades 7, a metal tube 17 and an intermediate ring 15 made of elastomer are provided. The role of this intermediate ring 15 is to soften the connection between the bar 4 and the blades 7 so as to reduce excess stresses where the bar is fitted in the loops 14.

What is claimed is:

1. A suspension system for a set of vehicle wheels with rigid axle, comprising:

a horizontal and transverse torsion bar made of a composite high resistance fiber-synthetic resin material and articulated on the chassis of the vehicle so as to be able only to rotate about its longitudinal axis; and two longitudinal elastic blades made of a composite high resistance fiber-synthetic resin material disosed laterally each on one side of said chassis, of which each is rigidly and directly connected at one of its ends to said torsion bar, is fixed in its intermediate part to said rigid axle and is in abutment at its other end against said chassis.

2. The suspension system of claim 1, wherein the means of connection between the torsion bar and the lateral elastic blades ensure considerable, but not absolute, rigidity.

3. The suspension system of claim 1, for a set of wheels of which the rigid axle is constituted by a rear axle, wherein said torsion bar lies to the rear with respect to said rear axle.

4. The suspension system of claim 1, wherein said lateral elastic blades are identical and disposed symmetrically with respect to the longitudinal axis of said vehicle.

5. The suspension of claim 1, wherein the bearing of each lateral elastic blade on the chassis comprises a shock absorber which is articulated about a transverse axis of the chassis and of which the line of action is aligned with said elastic blade.

6. The suspension system of claim 1, wherein the articulation of the torsion bar with respect to the chassis of the vehicle is obtained by means of at least one elastomeric bearing.

7. The suspension system of claim 6 wherein said elastomeric bearing comprises a ring of elastic material blocked between said torsion bar and a mount fastened to said chassis.

8. The suspension system of claim 1 including the rear drive axle of a road tractor.

9. The suspension system of claim 1 wherein said torsion bar and said blades are made of composite material constituted by fibers selected from the group consisting of glass, carbon, boron or mixtures thereof, coated with a synthetic resin so that high values are obtained for the ratio of modulus of elasticity to breaking stress in these parts.

10. The suspension system of claim 1 wherein each elastic blade comprises a loop at said one end, said loop being fitted coaxially to said torsion bar.

11. The suspension system of claim 10 wherein said torsion bar has a polygonal cross section.

12. The suspension system of claim 10 wherein said torsion bar is fitted within an intermediate elastomer ring and a metal tube fitted within said loop of said elastic blade, so that said intermediate elastomer ring softens the connection between said bar and said blade so as to reduce excess stresses.

13. The suspension system of claim 1 wherein said torsion bar is parallel to said axle.

14. The suspension system of claim 1 wherein said torsion bar is positioned on the side of said axle opposite a power shaft.

15. The suspension system of claim 1 wherein said blades areof constant section and are made of rovings of glass fibers impregnated with epoxy resin, oriented longitudinally in the axis of said blade, the whole being polymerized hot and under pressure in a mould.

* * * * *